United States Patent [19]
O'ffill

[11] Patent Number: 5,817,200
[45] Date of Patent: Oct. 6, 1998

[54] SURFACING OF REHABILITATING STRUCTURES

[75] Inventor: Robert J. O'ffill, San Clemente, Calif.

[73] Assignee: Ameron International Corporation, Pasadena, Calif.

[21] Appl. No.: 726,096

[22] Filed: Oct. 4, 1996

Related U.S. Application Data

[63] Continuation-in-part of Ser. No. 356,847, Dec. 15, 1994, Pat. No. 5,580,406.

[51] Int. Cl.$^6$ .................................................. F16L 55/162
[52] U.S. Cl. .............................. 156/94; 138/98; 156/294; 264/36.16; 264/269
[58] Field of Search ........................ 156/294, 94; 139/97, 139/98; 405/154, 155; 264/269, 36.16

[56] References Cited

U.S. PATENT DOCUMENTS

| | | |
|---|---|---|
| 2,794,758 | 6/1957 | Harper et al. . |
| 3,132,062 | 5/1964 | Lang et al. . |
| 3,424,203 | 1/1969 | Rubenstein ................................ 138/98 |
| 4,170,248 | 10/1979 | Bennett et al. ............................ 138/97 |
| 4,678,370 | 7/1987 | Allen ........................................ 405/154 |
| 4,995,929 | 2/1991 | Menzel ..................................... 156/294 |
| 5,101,863 | 4/1992 | Fujii et al. ................................ 138/98 |
| 5,102,263 | 4/1992 | Allen et al. .............................. 405/153 |
| 5,190,705 | 3/1993 | Corazza .................................... 264/36 |
| 5,388,929 | 2/1995 | Molyneux ................................ 405/154 |
| 5,395,472 | 3/1995 | Mandich .................................. 405/154 |

FOREIGN PATENT DOCUMENTS

| | | | |
|---|---|---|---|
| 2952540 | 7/1981 | Germany ................................ 264/262 |
| 3445871 | 6/1986 | Germany .................................. 138/97 |
| 64-42219 | 2/1989 | Japan ...................................... 264/270 |
| 2041147 | 9/1980 | United Kingdom ..................... 138/97 |

*Primary Examiner*—Daniel Stemmer
*Attorney, Agent, or Firm*—Christie, Parker & Hale, LLP

[57] ABSTRACT

A flexible liner is formed from a resilient material and includes a back side surface having a number of outwardly projecting members that extend a distance away from the liner. The flexible liner is in sheet form for rehabilitating surface sections, and is not in the form of a tube to cover an entire surface diameter. The outwardly projecting members each have a head enlarged profile configured to provide a strong mechanical lock with a carrier that is injected within an annular space disposed between the liner back side surface and the underlying substrate surface in need of surfacing or rehabilitation. The liner is positioned adjacent the structure surface by use of a collapsible, expandable form, and a carrier is injected within the annular space disposed therebetween so that the liner outwardly projecting members are completely enveloped by the carrier. The carrier is cured to form a mechanical lock between the outwardly projecting members and the carrier. The carrier cures to form a strong bond with the surface of the underlying substrate but not with the back side surface of the liner.

8 Claims, 5 Drawing Sheets

5,817,200

SURFACING OF REHABILITATING STRUCTURES

RELATION TO PATENT APPLICATIONS

This patent application is a continuation-in-part patent application of U.S. patent application Ser. No. 08/356,847 filed on Dec. 15, 1994, and issued on Dec. 3, 1996, as U.S. Pat. No. 5,580,406.

FIELD OF THE INVENTION

The present invention relates generally to a device and method for surfacing or rehabilitating concrete structures such as pipelines, manholes, tunnels, monolithic structures and the like, and, more particularly, to a device and method for surfacing or rehabilitating noncontinuous diameter surface sections of structures using a collapsible form.

BACKGROUND OF THE INVENTION

Concrete structures such as pipelines and manholes and the like that are buried beneath the surface are difficult and costly to replace and, therefore, are repaired or rehabilitated when leaks develop in such structures. For example, repairing sewer pipes which have developed leaks has proven to be an expensive operation, normally involving disruption of sewer services. One of the most common solutions has been to dig up the section of leaking sewer pipe and then replace it with new pipe which is suitably attached to the existing sewer pipe. However, the expense of this method is readily apparent, especially in urban setting, as is the disruption of sewer service. The same holds true for the replacement of other non-subterranean structures that are formed from concrete that serve to enclose a fluid handling device such as a pump, pipeline, tank and the like. Concrete structures are particularly susceptible to corrosion and erosion due to contact with or use in transporting liquids that are acidic in nature or that include some amount of solid component, respectively. Over time, the concrete structure subjected to such use will corrode and/or erode, causing wall portions of the structure to be eaten away and ultimately causing the structure to leak. As leaking liquid escapes from a subterranean pipe the ground surrounding the pipe serving as a foundation is eroded away from contact with the pipe, thereby leaving the already structurally weakened pipe without foundational support which may result in catastrophic structural failure.

Devices and methods for in-place surfacing or rehabilitation of concrete structures, to avoid the costly alternative of removal and replacement of such structures, have been developed and are known in the art. For example, U.S. Pat. No. 2,794,758 discloses a method and apparatus for in-place lining of a pipeline to protect the pipeline from the effects of corrosion and erosion. The apparatus comprises a housing that encloses a reel of flexible liner therein. The housing is attached at an outlet end to one end portion of the pipe to be repaired. A liquid pressure source, such as water and the like, is connected to an inlet end of the housing. Liquid entering the housing from the liquid pressure source imposes a pressure against a backside portion of the liner that has been attached at one end to a surface portion of the pipe. Continued exertion of liquid pressure against the liner backside surface causes the liner to unwind from the reel and be displaced through the length of the pipe. As the liner is displaced through the pipe the liquid pressure imposed against the backside surface causes the liner to unfold and be pressed against the wall surface of the pipe. Accordingly, this apparatus and method for repairing a pipeline relies on liquid pressure to dispense and place a flexible liner against the pipe wall portion requiring repair. This apparatus is, however, practically limited to the repair of pipelines only and, more particularly, to pipelines having a relatively small diameter, e.g., on the order of from 5–20 inches in diameter.

U.S. Pat. No. 3,132,062 discloses a method of in-place lining of conduit. The method comprises using a version of the housing and reel apparatus disclosed in U.S. Pat. No. 2,794,758, discussed above, that has been modified to include adhesive rollers disposed adjacent the housing end portion attached to the pipe. The method is an improvement of the method recited in U.S. Pat. No. 2,794,758, involving applying an adhesive material to the backside surface of the folded liner as the liner is being dispensed within the pipe to promote adhesion of the liner with an adjacent pipe wall surface. Again, however, this apparatus and method is limited only to the repair of pipelines and, more particularly, to pipelines having a relatively small diameter, e.g., on the order of from 5–20 inches in diameter.

U.S. Pat. No. 4,170,248 discloses a method for repairing sewer pipes by inserting a thin, flexible liner within the sewer pipe. The liner has an outside diameter that is less than the inside diameter of the sewer pipe, thereby forming an annular space therebetween. A top portion of the sewer pipe is removed at one location to expose the liner disposed therein. Packing is inserted at each sewer pipe end portion to seal off the annular opening between the liner and sewer pipe walls. The annular space between the sealed off ends is filled with a low viscosity cement by pouring the cement into a hole surrounding the removed top portion of the sewer pipe such that the cement can freely enter and fill the annular space. The cement is poured to a level above the top of the sewer pipe to provide a hydrostatic head to effect migration of the cement through the annular space between the liner and pipe and to the sealed ends. A overflow tube drilled into the top portion of the sewer pipe near each sealed end portion to provide an indication of whether the annular space is filled. This method, however, is also limited to repairing only pipelines and, more particularly, pipelines that are positioned in a horizontal orientation.

U.S. Pat. No. 4,792,493 discloses a corrosion resistant coating and liner combination used for repairing a water system pipe or reservoir comprising spray applying a polyurethane coating to a surface to be repaired and then adhering a sheet of polyvinyl chloride to the surface of the polyurethane coating. The polyvinyl chloride sheet is prepared for bonding to the surface of the polyurethane by applying a polyurethane primer-activator to the surface of the sheet. The polyvinyl chloride sheet is chemically bonded to the polyurethane coating by reaction of the primer activator and the polyurethane coating to provide a chemically resistant pipe liner. This method, however, does not provide long term leak protection as further cracking of the pipe is transmitted to an adjacent polyvinyl chloride sheet via the polyurethane coating, which causes the sheet to also crack and, thereby, permitting the escape of liquid from the pipe.

U.S. Pat. No. 5,101,863 discloses a method of rehabilitating underground pipes with an expanding helical wound liner. The method involves forming a helical wound liner made from a synthetic resin by winding a continuous strip of the resin around a virtual cylinder, of smaller outside diameter than the inside diameter of a pipe to be repaired, and interconnecting adjacent side edges of the strip together with a removable wire rod. The liner is then inserted into the pipe to be repaired and the leading end of the liner is attached to the inside wall of the pipe. The wire rod is removed, causing the liner to expand against the inside diameter of the pipe.

As the wire rod is removed from the liner a device inserted between the outside diameter of the liner and the inside diameter of the pipe deposits a foam back filling material onto the outside surface of the liner. The device deposits the back fill material as it is retracted from the pipe so that such back fill material is applied simultaneously to that section of the liner that is expanded against the pipe wall. This method is also limited to use in repairing only pipelines and, more particularly, is practically limited to repairing pipelines having a relatively moderate diameter in the range of from 12–36 inches in diameter.

U.S. Pat. No. 5,102,263 discloses a method of renovating and/or protecting sewers and pipes comprising forming a liner from lengths of PVC panels, placing the panels around the wall of the pipe, and butt-joining together end portions of panel. The panels are configured having complementary edge configurations so that each panel portion that is butt-joined together may be clipped together along edge portions with an adjacent panel portion. The backside surface of each panel includes T-shaped formations that extend outwardly away from the backside surface to contact an adjacent wall surface of the pipe. If needed, due to corrosion that has eaten away a section of the sewer wall, holes can be drilled in the sewer wall (post installation of the liner) and grout pumped into the cavity between the liner and sewer wall to provide support to the liner. This method is limited in that it applies only the renovation of sewer pipes and, more particularly, to the repair of an entire diameter section of the pipe, due to the interlocking nature of the panels and the lack of attachment means for supporting an individual panel against the sewer wall.

U.S. Pat. No. 5,190,705 discloses a method for lining large-diameter pipes comprising the steps of supporting a tubular lining within the pipe by using supporting props, injecting a hardenable mass into a space between the liner and the inside pipe wall surface, allowing the hardenable mass to cure, removing the props, and repeating the cycle for the next tubular lining section. The tubular liner may include T-shaped formations that extend outwardly away from a backside surface to anchor it, along with the remaining surface portion of the liner, solidly to the hardenable mass. This method is limited in that applies only to the repair of pipelines and relies on the use of a tubular liner.

It is, therefore, desired that a device be constructed and method be devised to use the device to facilitate the surfacing or rehabilitation of a wide range of concrete structures, including pipes, that serve to contain and/or transport a volume of liquid. It is desired that the device and method be adapted to accommodate surfacing or rehabilitating one or more section of a structure, rather than an entire diameter, having different geometries and sizes. It is desired that the surfacing or rehabilitating device be capable of surfacing a desired structure surface without having its entire surface bonded thereto, to prevent the liner from cracking or otherwise being damaged from cracking or movement of the underlying structure surface, thereby protecting against leakage from the structure in the event of future structure damage.

SUMMARY OF THE INVENTION

There is, therefore, provided in practice of this invention a device for surfacing or rehabilitating structures comprising a flexible liner formed from a resilient material that is preferably chemical and/or corrosion resistant. The liner has a back side surface that includes a number of outwardly projecting members that extend a distance away from the liner and that are positioned at repeating intervals. The outwardly projecting members each have a head portion that has an enlarged profile that is configured to provide a strong mechanical lock with a carrier injected into an annular interstitial space disposed between the liner back side surface and the surface portion of the underlying substrate in need of surfacing or rehabilitation.

A collapsible, expandable, traveling form is disposed within the structure to be surfaced or rehabilitated in its collapsed mode. Alternatively, the liner can be used to surface or rehabilitate an outside surface section of a structure, with or without the use of a form. The flexible liner is installed onto the form so that the liner back side surface is directed toward the structure surface section to be surfaced or rehabilitated. The liner can be installed on the form either before or after it is positioned within the structure, depending on the particular size and configuration of the structure. The form is activated, i.e., expanded, to move the flexible liner toward the structure surface. A volume of carrier is injected into an annular interstitial space disposed between the liner back side surface and the structure surface, filling the annular space and completely surrounding the outwardly projecting members. The carrier is allowed to cure or set up, and the collapsible form is collapsed and moved away.

The carrier is preferably formed from a cementitious material, such as cementitious grout and the like that is conventionally used to repair structure surfaces. Alternatively, the carrier can be formed from a resinous material that has good thixotropic properties and good chemical and/or corrosion resistance when cured. The carrier cures to form a strong bond with the surface of the underlying substrate but not with the back side surface of the liner. The liner outwardly projecting members, and more specifically the head portion thereof, are completely surrounded by the carrier and are mechanically locked therein by curing action of the carrier.

The flexible liner of this invention is in the form of a noncontinuous diameter, i.e., is not in tubular form, that allows for the surfacing or rehabilitating of structures other than pipes that have a number of different geometries and sizes. The lack of bond formed between the carrier and liner back side surface permits the liner to remain flexible and insulated from the structure surface, thereby minimizing the possibility that cracks or tears in the flexible liner will develop due to subsequent cracks in the underlying pipe wall.

BRIEF DESCRIPTION OF THE DRAWINGS

These and other features and advantages of the present invention will become appreciated as the same becomes better understood with reference to the specification, claims and drawings wherein:

DETAILED DESCRIPTION

Figure 1:
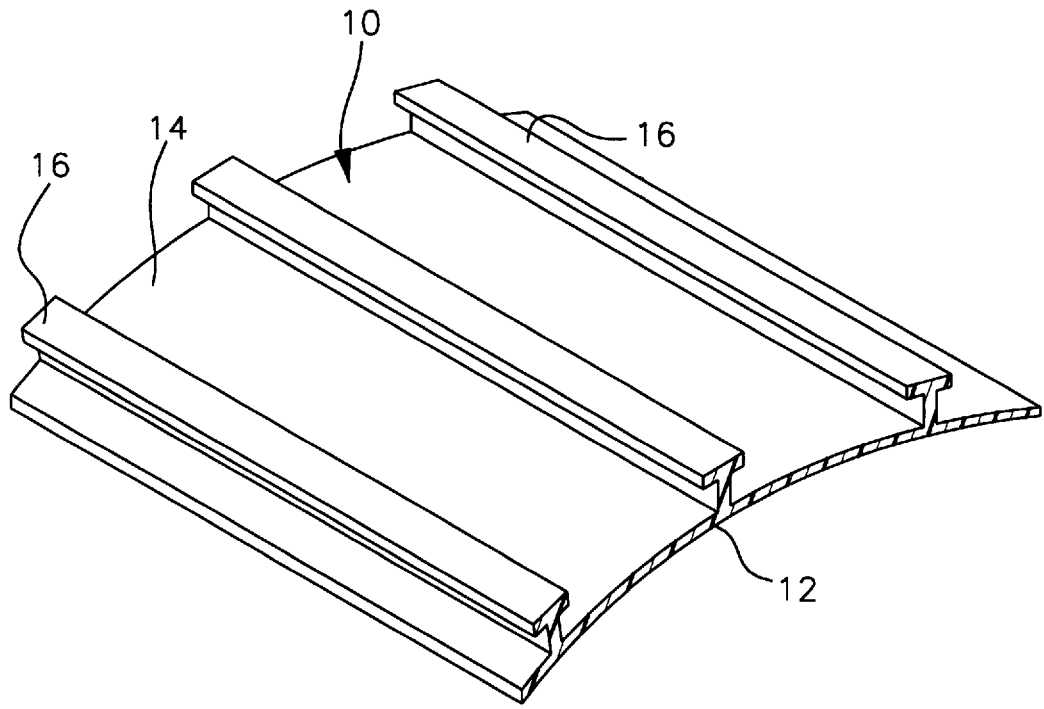
FIG. 1 is a perspective view of a flexible liner constructed in accordance with principles of this invention.

FIG. 1 illustrates a structure surfacing or rehabilitation device as constructed according to principles of this invention in the form of a flexible liner 10. The flexible liner is configured in the shape of a flat sheet, rather than as a tube of material, formed from a resilient material. FIG. 1 illustrates only a section of the flexible liner 10 for purposes of reference and clarity. It is to be understood that the flexible liner may be configured in the form of a sheet having a dimension that is dictated by the particular application. The liner is configured in sheet form, rather than in tubular form, to permit the liner to be used in a variety of different applications, e.g., applications having different surface geometries and sizes. For example, flexible liners of this invention can be sized to surface in the range of from 5 degrees to 355 degrees of the diameter of a concrete pipe or other circular structure surface. Because flexible liners of this invention are not in tubular form and, therefore do not cover the complete diameter of a concrete pipe or other structure, liners of this invention are desirable as they have no appreciable effect on the inside diameter or hydraulic properties of such structures. Additionally, use of flexible liners of this invention in sheet form is advantageous because it allows for the surfacing of rehabilitation of discrete surface sections without having to surface the entire diameter, thereby saving time associated with application and costs associated with raw materials.

It is desired that the flexible material be formed from a material that displays good chemical and corrosion resistance due to the formation acid species within the structure, e.g., sewer pipes, during use. The acid species are formed from hydrogen sulfide gas ($H_2S$), that is emitted by sewage carried by the pipes, that combines with water to form sulfuric acid ($H_2SO_4$). Because the $H_2S$ gas exists mainly along the top portion of the sewer pipes, the acid species that is formed also collects along the top portion of the sewage pipe, resulting in corrosion damage along the top 90 to about 300 degrees of the pipe. It is, therefore, desired that the flexible liner be made from a corrosion resistant material so that, when installed within the pipe, it can act to protect the pipe top portion from further corrosive damage. Suitable materials for forming the flexible liner include thermoplastic polymers such as polyvinyl chloride (PVC), polyethylene (PE), polypropylene (PP), and the like.

A preferred flexible liner may have a thickness of approximately 1.6 millimeters (1/16 inch) and be formed from PVC. It is desired that the flexible liner have a thickness that both facilitates flexibility, to accommodate a particular substrate geometry, and does not impact the volumetric and/or hydraulic characteristics of the underlying substrate. It is desired that the flexible liner be sufficiently flexible to permit its use in surfacing or rehabilitating different geometrically configured substrates, such as pipes having different diameters, rectangular or square structures having flat surfaces and the like. It is, therefore, intended that application of the flexible liner 10 not be limited to surfacing or rehabilitating substrates in the form of pipes. It is also to be understood that flexible liners of this invention can be used to surface or rehabilitate an outside surface section of a structure.

The flexible liner 10 has a smooth front side surface 12 that, after installation adjacent the underlying substrate, forms the outer facing surface of the particular substrate. The front side surface may, therefore, be placed in direct contact with the fluid being contained or transported by the substrate. It is desired that the front side surface be smooth so as to not adversely impact the hydraulic characteristics of the underlying substrate. The flexible liner 10 has a back side surface 14 that includes a plurality of outwardly projecting members (OPM) 16 that each extend a distance away from the back side surface. The OPM may be in the form of ribs, knobs, studs and the like. The OPM 16 are positioned at regularly or irregularly repeating intervals along the back side surface 14 of the liner and are each configured having a head portion 18 having an enlarged profile to facilitate forming a mechanically locking engagement with a carrier that is injected between the liner backside surface and the structure surface, as will be discussed in detail below. The primary purpose of the OPMs 16 is to provide a mechanically locking engagement with the carrier, rather than to provide an offset from a surface portion of the underlying substrate. In a preferred embodiment, the OPMs are integral with the liner and are positioned along the liner back side surface at approximately 63.5 millimeter (2½ inch) intervals. Although the flexible liner has been described and illustrated having a specific thickness and OPM placement interval, it is to be understood that the liner thickness and OPM placement may vary according to each particular application.

Figure 3A:
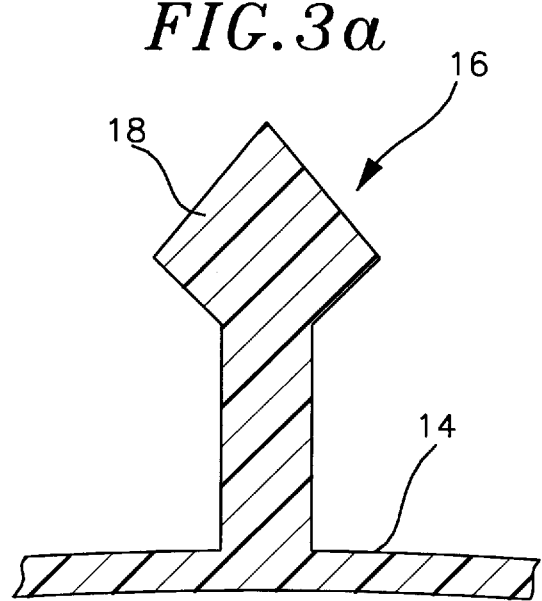
FIGS. 3a–3d are cross-sectional side elevation views of different embodiments of ribs constructed according to principles of this invention.
Figure 2:
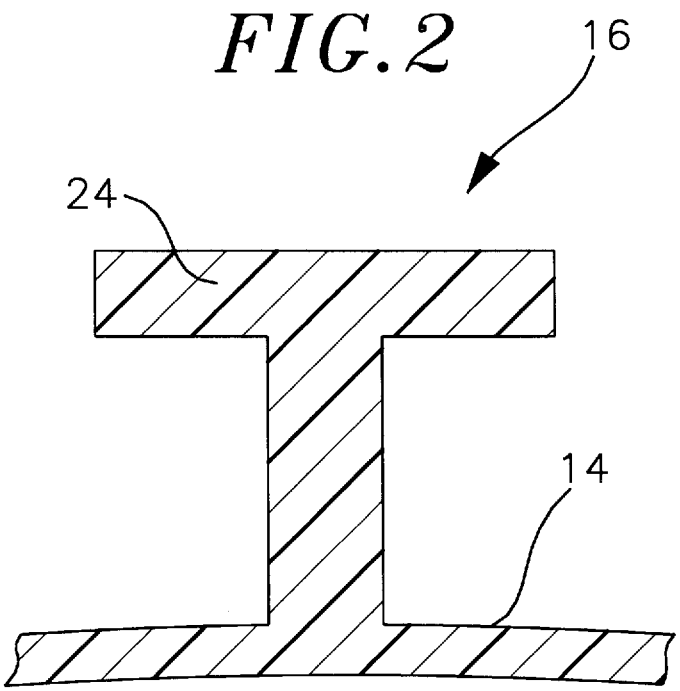
FIG. 2 is an enlarged cross-sectional side elevation view of a rib projecting from the flexible liner of FIG. 1.
Figure 3D:
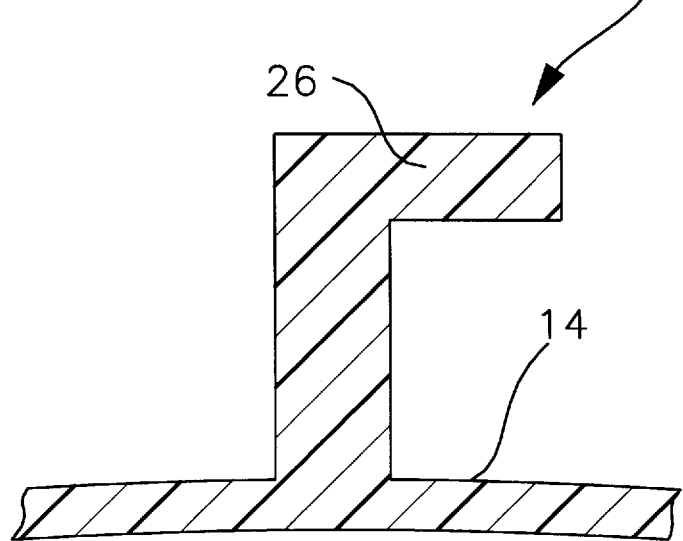
Figure 3B:
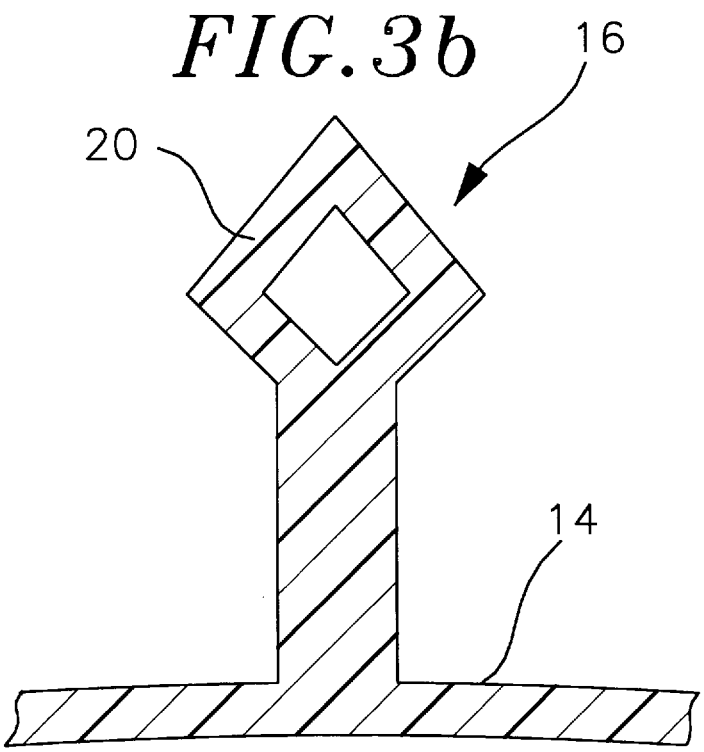
Figure 3C:
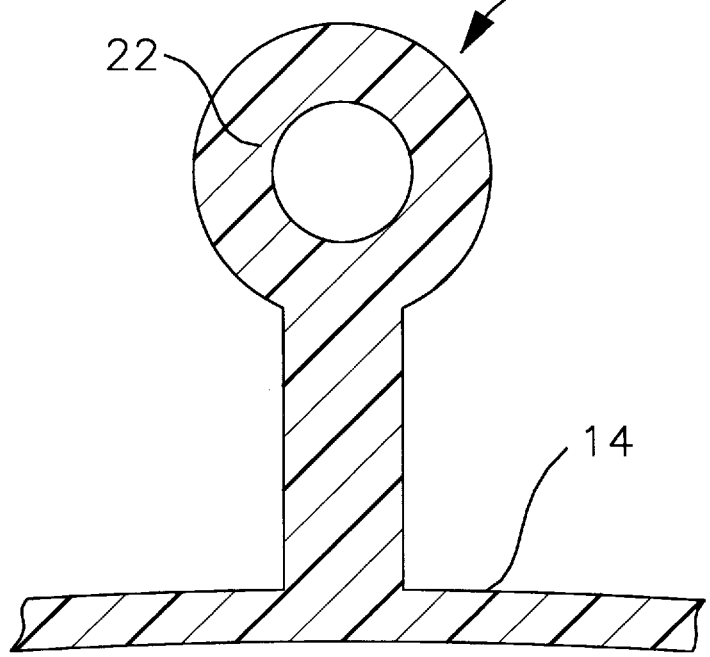

In FIG. 1, the flexible liner 10 includes OPMs 16 having a head portion 18 configured in the shape of a "T", having a stem portion extending perpendicularly away from the back side surface, and a cross portion at the end of and perpendicular to the stem (as best shown in FIG. 2). The "T" shaped head portion is desired because of its ability to form a strong mechanical lock with the cured carrier. The OPMs 16 can also be configured having differently shaped head portions 18 such as those shown in FIG. 3a (a solid arrow-shaped profile 20), FIG. 3b (a hollow arrow-shaped profile 22), FIG. 3c (a hollow circular profile 24), and FIG. 3d (a right angle or sheep leg shaped profile 26). It is to be understood that the OPM configurations specifically described above and illustrated are intended to be representative of the different ways in which the OPMs may be configured for purposes of reference and clarity only and, therefore, are not meant to be limiting. For example, the OPMs 16 may have a head portions 18 configured having a square, rectangular, or triangular shape. In a preferred embodiment, the OPMs 16 have a head portion 18 configured in the shape of a "T", as shown in FIGS. 1 and 2. In an exemplary embodiment, each OPM 16 projects outwardly away from the back side surface 14 a distance of approximately 9.5 millimeters (⅜ inch).

Figure 4:
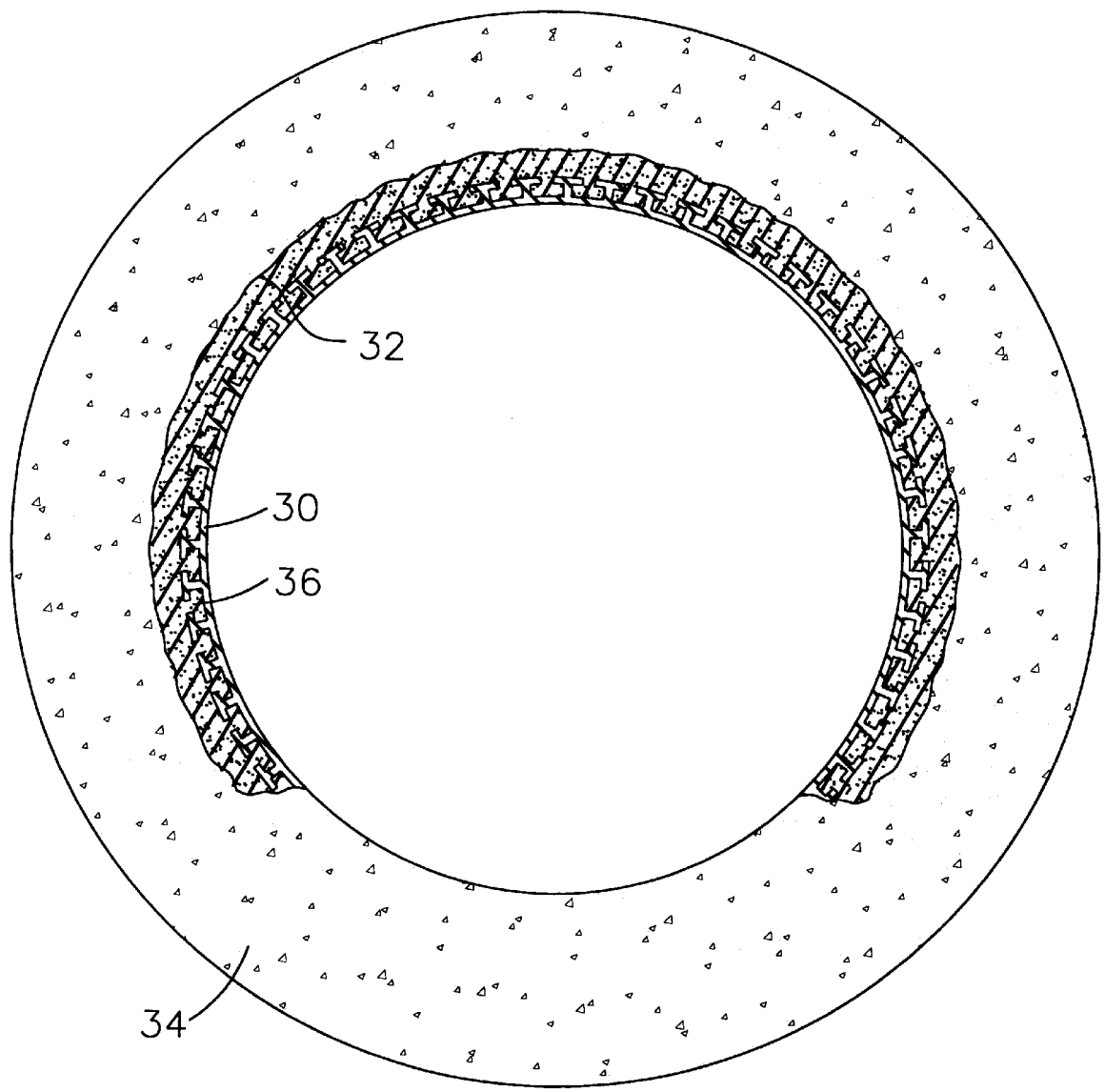
FIG. 4 is a cross-sectional side elevation views of the flexible liner of FIG. 1 installed against an inside wall surface section of a concrete pipe.

FIG. 4 illustrates the flexible liner 30 after it has been installed against an inside wall surface section 32, e.g., about 270 degrees, of a concrete pipe 34, e.g., a sewer pipe. A carrier 36 is interposed between the back side surface of the liner 30 and the wall surface 32. A suitable material for forming the carrier 36 can be selected from the group of materials including resinous materials, cementitious materials, polymer materials, gel-like materials and mixtures thereof. In certain applications, it may be desirable that the carrier material demonstrate good chemical and corrosion resistance upon curing to form a corrosion protective layer on the substrate surface. It is desired that the selected carrier material have good flow characteristics during application to facilitate enveloping the head portion of each OPM. Other desired properties of the carrier is that it be capable of adhering to uncured wet or very damp concrete, brick, and other surfaces that have been previously corroded and/or eroded.

It is desired that the carrier not slump on vertical surfaces and overhead surfaces, and be sufficiently thixotropic to carry the weight of the flexible liner while curing. It is desired that the carrier be non-toxic, have low to zero volatile organic compounds, and be user friendly. It is also desired that the carrier be capable of curing within a short amount of time at ambient temperatures between 5° C. and 38° C. (40° F. and 100° F.). In a preferred embodiment, the carrier can cure or harden completely at room temperature (25° C.) in approximately one hour. The cure reaction of the carrier is exothermic and is influenced by the ambient temperature. Therefore, it is to be understood that the cure rate of the carrier will vary depending on the ambient temperature.

It is desired that the carrier cure to form a strong bond with the surface of the substrate but not with back side surface of the flexible liner so that the only mechanism retaining the flexible liner against the carrier is the mechanical lock that is formed between the OPMs and the carrier. The formation of a bond between the carrier and the flexible liner back side surface is not desired so that the flexible liner can remain flexible with respect to and independent from the adjacent wall surface. This eliminates the possibility of the flexible liner cracking or tearing as a result of cracks that develop in the substrate 24 and that are transmitted from the wall portion 32 to the carrier 36. Constructed in this manner, the flexible liner 30 is better able to protect against fluid or gas leakage from the pipe due to the development of such pipe cracks. Additionally, the flexible liner is better able to prevent ingress of ground water into the pipe due to the development of such pipe cracks in applications where the pipe is buried at a depth equal to or below the ground water level. In such cases the ground water passing through the cracks in the pipe is trapped between the pipe wall section and the back side surface of the liner, and is thereby prevented from entering the pipe.

If desired, the carrier can be reinforced with various different materials such as fibers, meshes, and the like, which could be made from polypropylene, carbon, steel fiberglass, and others to increase the strength of the carrier. In a preferred embodiment, the carrier material is in the form of a cementitious grout or the like that can be formulated to include quick cure hardeners, slump retardants, and other additives to provide a desired degree of workability, and working or "in use" features. It may be desirable that the carrier material comprise an aluminum carbonate base material because of its quick cure time and low viscosity, which would easily flow around and surround the enlarged rib profiles. Cementitious grouts and the like conventionously used to surface and/or rehabilitate concrete structure can be used.

Alternatively, the carrier material can comprise a two-part epoxy resin comprising a resin component and a hardener or catalyst component. An example resin component may include reaction products from combining an epoxide with a phenol, such as epicholorohydrin and Bisphenol A. An example hardener or catalyst component may include an amine and alcohol such as tetraethylenepentamine and benzyl alcohol. The carrier material may also comprise an amount of extender in the form of calcium silicate, silica sand, hollow glass spheres and the like. Use of the extender is desired for economic reasons, to decrease the amount of resin and hardener component that is needed to cover a particular substrate portion, i.e., make a particular repair. An example extender is in the form of hollow glass spheres, and a preferred carrier may include in the range of from 5 to 30 percent by weight extender. However, it is to be understood that the carrier can be prepared and used without the extender is desired. An exemplary alternative type of carrier material is manufactured by Jeffco Products of San Diego, Calif. under the product number 9912.

Figure 5:
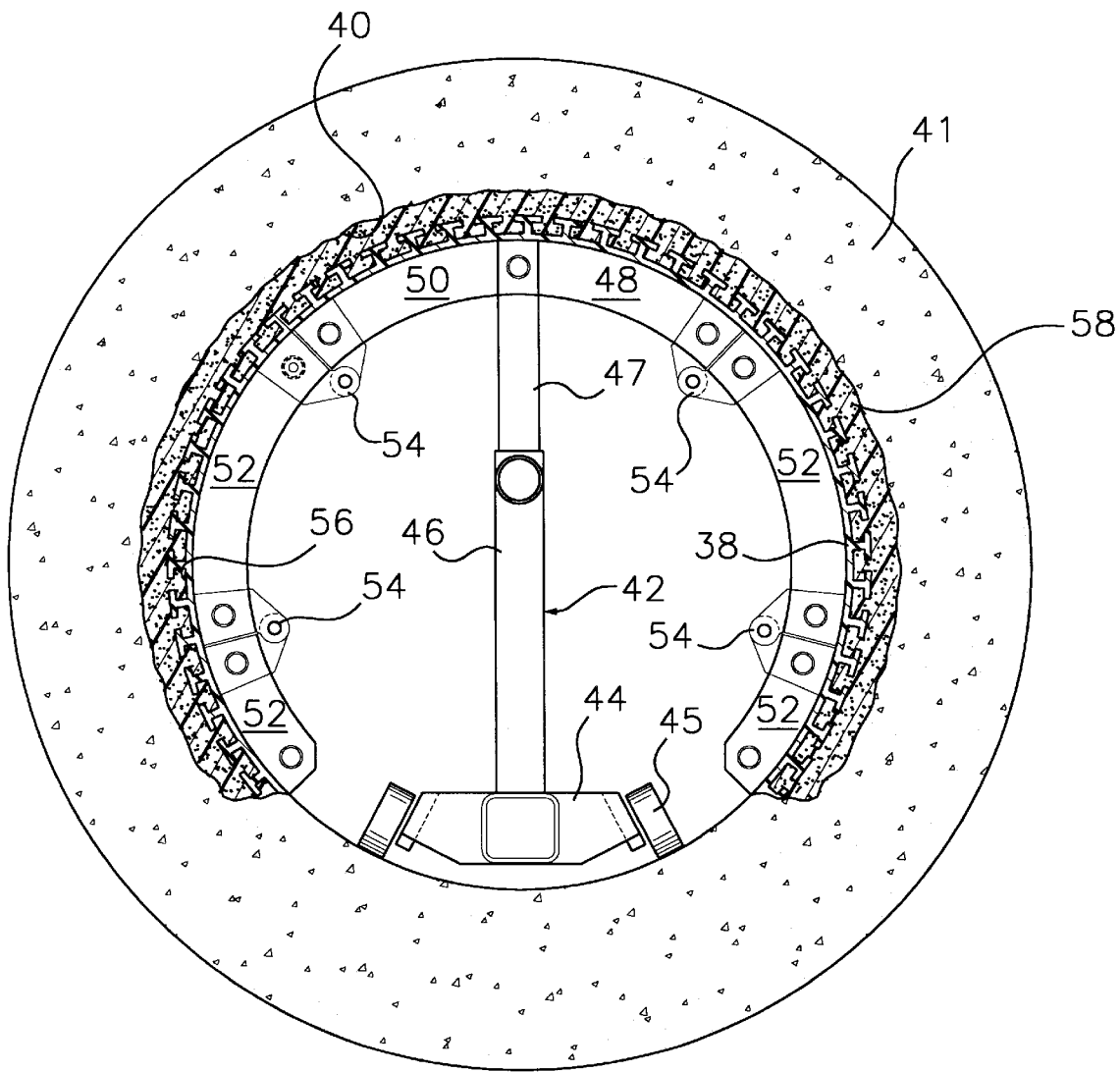
FIG. 5 is cross-sectional front view of the flexible liner of FIG. 1 being installed against an inside wall surface section of a concrete pipe using a collapsible, traveling form.

FIG. 5 illustrates a section of the flexible liner 38 as it is being installed within an inside diameter of a pipe 40 to repair a corroded and/or eroded pipe wall surface section 40. The wall section 40 is first cleaned and then, if necessary, built up to its original wall thickness by applying mortar or other suitable concrete patch material. A collapsible, traveling form 42 is positioned axially within the structure. The form 42 comprises a base member 44 at the bottom of the form that includes means for moving the form axially within the structure. In a preferred embodiment, such means are in the form of wheels 45 that are rotatably attached to the base member 44. A collapsible member 46 extends perpendicularity away from the base member and includes means for extending and collapsing the collapsible member. In a preferred embodiment, the means for collapsing and extending the collapsible member is in the form of a pneumatically operated piston 47. Arms 48 and 50 are movably attached to and extend in opposite directions from an end of the collapsible member 46, and each include a number of arm sections 52 that are movably attached to one another by hinges 54. The arms 48 and 50 are configured in the shape of an arc to complement and fit within the diameter of the structure.

A desired axial section length of the flexible liner 38 is loaded onto the arms 48 and 50 of the form 42 so that the liner back side surface 56 is directed toward the wall surface section 40. Depending on the size and configuration of the structure to be repaired, the liner can be loaded onto the form either before or after it is moved into place within the structure. For example, when surfacing a concrete pipe of relatively small diameter that can not be entered by a human, the liner is loaded onto the form before the form is positioned within the structure.

As illustrated in FIG. 5, in such example application, the liner 38 is configured to surface approximately 270 degrees of the pipe wall surface, leaving approximately 90 degrees of the pipe wall surface along the bottom portion of the pipe exposed. The form is activated to extend the collapsible member 46, thereby moving the liner back side surface 56 near to the pipe wall surface section 40. In surfacing the structure surface is desired that the liner be oriented into a position adjacent the structure surface that replicates the structure surface geometry, e.g., that replicates the wall diameter in the case of a concrete pipe. To maximize the strength of the mechanical bond that forms between the OPMs and the carrier, it is desired that the liner be positioned far enough away from the pipe wall surface 40 so that the head portions of each OPM are a distance away from the wall surface. Avoiding contact between the head portions of the OPMs and the structure surface maximizes the extent to which the carrier is able to surround and envelope the entire enlarged profile of each OPM head portion, thereby maximizing the strength of the mechanical lock formed therewith.

The form 42 includes a carrier inlet (not shown) for accepting carrier that is pumped to it via conventional method. The form arms 48 and 50 each include carrier fill openings (not shown) and carrier vent openings that are distributed along the surface of each arm. Holes are placed through the liner at locations corresponding to each arm fill and vent opening. After the liner 38 is positioned adjacent the pipe wall surface section 40, the carrier 58 is injected into an annular interstitial space between the liner back side surface 56 and the pipe wall surface section 40 via the arm carrier fill openings. Trapped air from the annular space is vented therefrom via the arm vent openings to enable efficient and complete carrier filling. Bulkheads or inflatable bladders can be used to seal off axial liner segments prior to the injection off the carrier material. After the carrier 58 has cured or set up, the form 42 is removed or moved to a different location, and the carrier fill and vent holes made through the liner 38 are patched.

While a method for applying a flexible liner prepared according to principles of this invention has been specifically described in the context of a concrete pipe, it is to be understood that the flexible liner and method for applying the same can be used to surface or rehabilitate other concrete structures. Further, it is to be understood within the scope of this invention that the flexible liner can be used to surface or rehabiltate exterior structure surface sections as well as interior surface sections. The flexible liner can be configured in any size needed to accommodate a particular surfacing or rehabilitation application from a single sheet, or can be configured to accommodate a particular application by using a number of smaller liner sheets that can be joined together by conventional techniques such as by adhesive or hot air welding in the field, or by dielectric welding at the point of manufacture. Although the flexible liner and method for applying the same has been described and illustrated for use in surfacing or rehabilitating concrete substrates, e.g., sewer pipes and the like, it is to be understood that the flexible liner and method of this invention may be used to surface or rehabilitate non-concrete structures as well such as brick and other masonry structures.

Although limited embodiments of the device and method for surfacing or rehabilitating structures have been described herein, many modifications and variations will be apparent to those skilled in the art. Accordingly, it is to be understood that, within the scope of the appended claims, the device and method for surfacing or rehabilitating structures may be embodied other than as specifically described herein.

What is claimed is:

1. A method for surfacing or rehabilitating an annular structure comprising the steps of:

positioning a flexible liner adjacent a wall surface section of the structure to substantially replicate the structure wall surface section, the flexible liner having a plurality of outwardly projecting members extending a distance away from a back side surface of the liner towards the structure wall surface section, the liner being in the form of a sheet that is circumferentially noncontinuous;

placing a carrier material within an annular interstitial space formed between the liner back side surface and the surface section of the structure; and curing the carrier material to form a mechanical lock between the outwardly projecting members and the carrier material.

2. The method as recited in claim 1 wherein during the step of curing, the carrier forms a strong bond with the surface section of the structure but not with the back side surface of the liner.

3. The method as recited in claim 1 comprising forming a mechanical lock between the carrier and head portions of the outwardly projecting members that are configured having an enlarged profile to resist outward travel from the carrier and facilitate formation of the mechanical lock.

4. The method as recited in claim 1 wherein during the step of positioning, the liner is placed a sufficient distance away from the surface section of the structure to so that a head portion of each outwardly projecting member is completely surrounded by the carrier material during the step of placing.

5. A method for surfacing or rehabilitating a structure comprising the steps of:

positioning a sheet of flexible liner adjacent a wall surface section of the structure to substantially replicate the wall surface section of the structure, the flexible liner having a plurality of outwardly projecting members extending a distance away from a back side surface of the liner, each outwardly projecting member having a head portion that has an enlarged profile, the liner sheet being circumferentially noncontinuous;

placing a carrier material within an annular interstitial space formed between the liner back side surface and the surface section of the structure; and forming a mechanical lock between the outwardly projecting members and the carrier material by action of the carrier curing, wherein the carrier forms a strong bond with the surface section of the structure but not with the back side surface of the liner.

6. The method as recited in claim 5 comprising forming a chemically resistant protective layer on the surface section of the structure by placing a carrier having chemically resistant properties after curing within the annular interstitial space.

7. The method as recited in claim 1 further comprising, before the step of positioning, the step of placing the sheet of flexible liner onto a collapsible form, wherein during the step of positioning, the collapsible form is expanded to move the liner toward the structure surface section.

8. The method as recited in claim 5 wherein the sheet of flexible liner is formed from a thermoplastic polymer.

* * * * *